United States Patent
Elfwing

(10) Patent No.: US 9,884,652 B2
(45) Date of Patent: Feb. 6, 2018

(54) REINFORCEMENT STRUCTURE

(71) Applicant: VOLVO CAR CORPORATION, Gothenburg (SE)

(72) Inventor: Jens Elfwing, Torslanda (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 15/131,467

(22) Filed: Apr. 18, 2016

(65) Prior Publication Data
US 2016/0311469 A1    Oct. 27, 2016

(30) Foreign Application Priority Data
Apr. 24, 2015 (EP) ................................. 15165012

(51) Int. Cl.
| | | |
|---|---|---|
| *B62D 25/04* | (2006.01) | |
| *B62D 25/02* | (2006.01) | |
| *B62D 21/15* | (2006.01) | |
| *B62D 65/00* | (2006.01) | |

(52) U.S. Cl.
CPC .......... *B62D 25/04* (2013.01); *B62D 21/157* (2013.01); *B62D 25/02* (2013.01); *B62D 65/00* (2013.01)

(58) Field of Classification Search
CPC ....... B62D 21/157; B62D 25/04; B62D 25/02
USPC ........................ 296/193.06, 203.03
See application file for complete search history.

(56) References Cited

U.S. PATENT DOCUMENTS

| | | | |
|---|---|---|---|
| 6,524,404 B2 | 2/2003 | Gehringhoff et al. | |
| 2010/0194146 A1* | 8/2010 | Nishimura | B62D 21/157 |
| | | | 296/193.06 |
| 2012/0304448 A1 | 12/2012 | Hartmann et al. | |
| 2012/0319431 A1* | 12/2012 | Bodin | B62D 29/007 |
| | | | 296/203.03 |
| 2013/0187410 A1* | 7/2013 | Wawers | B62D 21/157 |
| | | | 296/193.06 |
| 2015/0360733 A1* | 12/2015 | Nagwanshi | B62D 29/004 |
| | | | 180/311 |

FOREIGN PATENT DOCUMENTS

| | | |
|---|---|---|
| DE | 102009041703 A1 | 4/2010 |
| DE | 102013010024 A1 | 12/2014 |
| DE | 102014014259 A1 | 4/2015 |
| EP | 2392504 A1 | 12/2011 |
| WO | 2011054575 A1 | 5/2011 |

OTHER PUBLICATIONS

Extended European Search Report dated Oct. 8, 2015, Application No. 15165012.4-1755, Applicant Volvo Car Corporation, 6 Pages.

* cited by examiner

*Primary Examiner* — Dennis H Pedder
(74) *Attorney, Agent, or Firm* — Brooks Kushman P.C.

(57) ABSTRACT

The present disclosure relates to a reinforcement structure for a vehicle. The reinforcement structure has a main extension direction and comprises a first portion and a second portion. The first portion comprises, or consists of, a more ductile material than the second portion. The first portion and the second portion are joined to each other in an overlap zone extending along the main extension direction, such that the first portion and the second portion extend parallel to each other along the main extension direction in the overlap zone. The present disclosure also concerns a vehicle comprising at least one such reinforcement structure. The disclosure further relates to a method for manufacturing a reinforcement structure.

19 Claims, 3 Drawing Sheets

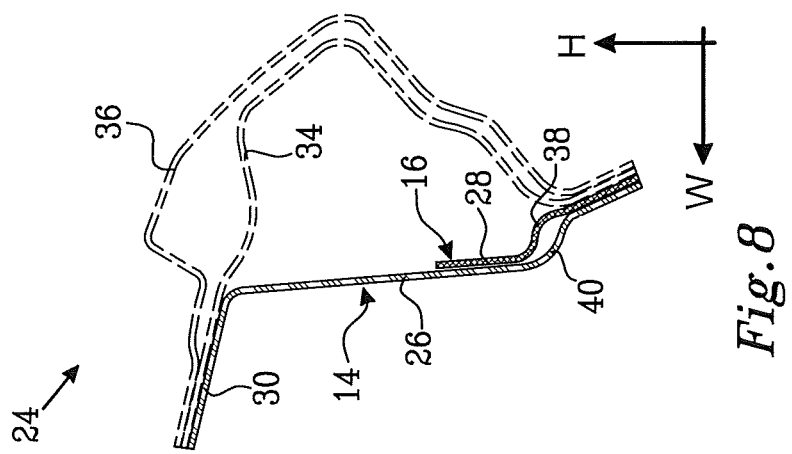
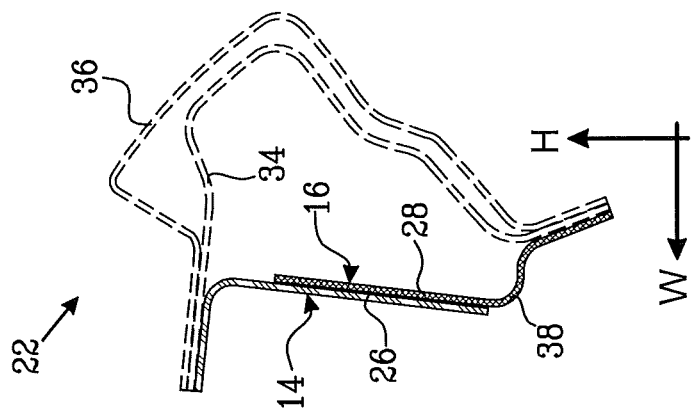
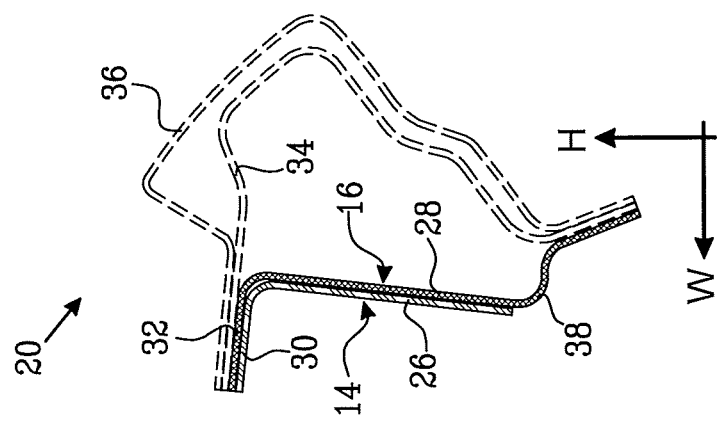

REINFORCEMENT STRUCTURE

CROSS-REFERENCE TO RELATED APPLICATIONS

This application claims foreign priority benefits under 35 U.S.C. § 119(a)-(d) to European patent application number EP 15165012.4, filed Apr. 24, 2015, which is incorporated by reference in its entirety.

TECHNICAL FIELD

The present disclosure relates to a reinforcement structure for a vehicle. The present disclosure also concerns a vehicle comprising at least one such reinforcement structure. The disclosure further relates to a method for manufacturing a reinforcement structure.

BACKGROUND

By law, all new car models must pass certain safety tests and certifying procedures in different countries or regions, such as side impact tests, for example pole side impact tests, before they are sold.

Several reinforcement structures for vehicles having improved side impact crash behavior have been disclosed in the prior art. For example, U.S. Pat. No. 6,524,404 discloses a B-pillar, i.e., a pillar that supports the roof of a vehicle and that is located between the front and rear side windows, having improved crash behavior and which constitutes a longitudinal steel profile. The longitudinal profile has a first upper longitudinal portion comprised of a martensitic material structure and a strength of more than 1400 N/mm$^2$ and has a second lower longitudinal portion of higher ductility with a predominantly ferritic-perlitic material structure and a strength of below 850 N/mm$^2$.

SUMMARY

An object of the present disclosure is to overcome or ameliorate at least one of the disadvantages of the prior art, or to provide a useful alternative.

Thus, in a first aspect of the present disclosure there is provided a reinforcement structure for a vehicle. The reinforcement structure has a main extension direction and comprises a first portion and a second portion. The first portion comprises, or consists of, a more ductile material than the second portion. The first portion and the second portion are joined to each other in an overlap zone extending along the main extension direction, such that the first portion and the second portion extend parallel to each other along the main extension direction in the overlap zone.

The reinforcement structure may form, or be a part, of a pillar structure, e.g., of an A-pillar, a C-pillar, a D-pillar, or a roof rail. A roof rail is the structural component that extends between the roof and the side of the vehicle. The A-pillar is a structural support on a side of a vehicle's windscreen located just ahead of and above the vehicle's front doors. The A-pillar may be considered to extend up to the point where the A-pillar meets a B-pillar. An A-pillar may, however, also be considered to include a structural component that forms a continuation of the A-pillar that extends above the doors of the vehicle along the roof of the vehicle. An A-pillar and a C-pillar or a D-pillar may together form the roof rail in some vehicles. Alternatively, a roof rail may be provided between vehicle pillars, e.g., between the A- and B-pillar and/or between the B- and C-pillar etc., in vehicles such as estate cars or station wagons.

The reinforcement structure has a main extension direction substantially following a center-line of the reinforcement structure. If the reinforcement structure is curved, e.g., being part of the A-pillar structure, the main extension direction is curved as well, but it is also feasible that the main extension direction is straight, such that the main extension direction forms an axial direction, e.g., if the reinforcement structure is part of a B-pillar structure. A width direction is defined as being perpendicular to the main extension direction. When the reinforcement structure is located in the vehicle, the width direction corresponds to a lateral direction of the vehicle, i.e., going sideways in the vehicle. A third direction of the reinforcement structure is perpendicular to the main extension direction and to the width direction. If the reinforcement structure is curved and/or inclined, the third direction of the reinforcement structure deviates from the vertical direction of the vehicle. This may e.g., be the case if the reinforcement structure is part of the A-pillar structure, except for where the A-pillar structure extends substantially horizontally, such as at the rear part of the A-pillar structure. In a vehicle, a B-pillar structure is usually arranged with its main or axial direction extending generally vertically. If the reinforcement structure forms part of or constitutes the B-pillar structure, the main extension direction of the reinforcement structure would coincide with the substantially vertical axial direction of the B-pillar. The width direction of the reinforcement structure, which is perpendicular to the main extension direction of the reinforcement structure, would coincide with the lateral direction of the vehicle and the third direction of the reinforcement structure, which is perpendicular to both the main extension direction and the width direction, would coincide with the longitudinal direction of the vehicle.

When the reinforcement structure is located in the vehicle, the first portion may form an upper portion and the second portion may form a lower portion of the reinforcement structure. In an A-pillar structure, the first portion may then form a rearward portion and the second portion may form a forward portion of the reinforcement structure.

It has been found that in the event of side impact collisions involving a vehicle comprising a reinforcement structure according to known technology, cracks may form in the upper part of the vehicle's reinforcement structures, which may consequently result in a passenger compartment intrusion. In the event of a side impact collision involving a vehicle with a reinforcement structure as described herein, the reinforcement structure will bend without cracking, or it will be substantially less likely to crack due to the greater ductility in the first portion and will therefore improve the vehicle's ability to survive the side impact without suffering passenger compartment intrusion.

The overlap zone may have an extension along the main extension direction of the reinforcement structure in the range of 100-800 mm, preferably in the range of 200-600 mm, more preferably in the range of 300-500 mm.

The second portion may comprise, or consist of, a stronger and/or thicker material than the first portion.

Different kinds of materials may be utilized for the first portion and the second portion, e.g., two different kinds of steel. The material of the first portion may have an elongation above 20%. The second portion may have a tensile strength of at least 1300 MPa. The elongation of the material of the second portion may be selected to be less than 20%. The second portion may comprise boron steel. Since two different materials are utilized, the material properties of the respective first and second portions may be selected independently of each other, as long as it is possible to join the two materials in the overlap zone.

The first portion and the second portion extend at least partly side-by-side in the overlap zone. The side-by-side arrangement may be in any direction, which is perpendicular to the main extension direction of the reinforcement structure, such as in the width direction or in the third direction of the reinforcement structure, or both in the width direction and in the third direction. The first and second portions of the reinforcement structure are preferably in direct contact with each other within the overlap zone.

By way of example, when the reinforcement structure forms part of an A-pillar structure in a vehicle and the side-by-side arrangement in the overlap zone is in the width direction, one portion of the reinforcement structure is arranged laterally inside the other portion of the reinforcement structure as seen in the lateral direction of the vehicle, preferably the first portion being arranged laterally inside the second portion, as seen in the lateral direction of the vehicle. In addition, a part of the second portion, e.g., a flange thereof, may be superposed on a part of the first portion, e.g., a flange thereof, i.e., being located vertically on top of.

A wall portion of the first portion may be joined to the second portion in the overlap zone. The wall portions of the first and second portions may extend substantially vertically in parallel to each other.

The first portion and the second portion may be joined to each other by means of welding, e.g., spot welding or laser welding. It would also be feasible to, as a complement or in addition, use an adhesive or a fastening means, such as a rivet.

The reinforcement structure may form an inner reinforcement structure of the vehicle pillar structure.

The first portion may comprise a flange portion forming an upper flange of the inner reinforcement structure.

The second portion may be adapted to continue downwards via a bend to join with an outer reinforcement structure, which is also comprised in the vehicle pillar structure.

In a second aspect of the present disclosure there is provided a vehicle comprising at least one reinforcement structure as described herein.

As mentioned above, the reinforcement structure may form, or be a part of a pillar structure, e.g., of an A-pillar, a C-pillar, a D-pillar, or a roof rail.

The reinforcement structure may be arranged such that, the more ductile first portion forms an upper portion and the second portion less ductile forms a lower portion of the reinforcement structure as seen in a vertical direction of the vehicle, e.g., if the reinforcement structure is part of the A-pillar structure. As mentioned above, the first and second portions extend parallel to each other in the overlap zone. The first portion then extends from the overlap zone and upwards, while the second portion extends in the overlap zone and downwards.

In a case where the reinforcement structure forms part of the A-pillar structure of the vehicle, the second, less ductile portion of the reinforcement structure may be arranged forward of the more ductile first portion of the reinforcement structure. In the overlap zone, the first portion may be arranged inside the second portion, as seen in the lateral direction of the vehicle, the first portion being located facing an interior of the vehicle and the second portion facing outwards.

If the vehicle would be subjected to a front impact, a main portion of the collision load would then be taken up by the strong second portion, which is most forward and thus closest to the impact zone, resulting in the reinforcement structure being stiff in a front impact scenario, thereby helping to protect occupants in a passenger compartment of the vehicle. In the overlap zone, the lateral outside of the reinforcement structure would be subjected to a pressure load, while the lateral inside would be subjected to a tension load. By utilizing a reinforcement structure as described herein, the pressure load would mainly be taken up by the stiffer second portion, while the tension load would be taken up by the more ductile first portion. The overlap zone provides a strong connection between the first portion and the second portion in the front impact scenario and constitutes a transition zone between the part of the reinforcement structure being mainly subjected to a pressure load and the part of the reinforcement structure being mainly subjected to a tension load.

If a vehicle, wherein the first portion is arranged laterally inside the second portion, as seen in the lateral direction of the vehicle, would be subjected to a pole side impact at the reinforcement structure, the pole would press the reinforcement structure laterally inwards, into the vehicle passenger compartment. The pole side impact generally hits the vehicle in the overlap zone and/or above the overlap zone, where the more ductile first portion is present. The main load would be taken up by the more ductile first portion, e.g., by a substantially horizontally oriented flange thereof, which substantially extends laterally inwards in the vehicle. Thereby the main load is taken up by the more ductile first portion, such that the reinforcement structure as described herein will bend without cracking, or at least it will be substantially less likely to crack, due to the high ductility in the first portion. The reinforcement structure will therefore improve the ability of the vehicle to survive the side impact without suffering passenger compartment intrusion.

In a third aspect of the present disclosure there is provided a method for manufacturing a reinforcement structure for a vehicle. The reinforcement structure has a main extension direction and comprises a first portion and a second portion. The method comprises:

providing a first portion and a second portion, the first portion comprising, or consisting of, a more ductile material than the second portion, joining the first portion and the second portion to each other in an overlap zone extending along the main extension direction, such that the first portion and the second portion extend parallel to each other along the main extension direction in the overlap zone.

It is known to obtain different material properties within a known reinforcement structure for a vehicle by subjecting different parts of the known reinforcement structure to different treatments, e.g., to heat treatment at high temperatures, e.g., in order to obtain a desired steel structure. However, this may be cumbersome and hence costly.

By utilizing a reinforcement structure as described herein, the material properties of the respective portions may be selected independently of each other, as long as the two materials are possible to join in the overlap zone. Hence the cumbersome work of treating different portions of a reinforcement structure in different ways may be omitted. The first and second portions may be treated in different ways by treating each portion as a whole before they are joined to each other. Purely as an example, the second portion may be heat treated in order to obtain a steel which is stiff and strong.

The joining of the first portion and the second portion to each other in the overlap zone may be performed by means of welding, e.g., spot welding or laser welding.

BRIEF DESCRIPTION OF THE DRAWINGS

Examples according to the present disclosure will hereinafter be further explained with reference to the appended drawings wherein:

FIG. 6 is a first cross-sectional view of the A-pillar structure;

FIG. 7 is a second cross-sectional view of the A-pillar structure; and

FIG. 8 is a third cross-sectional view of the A-pillar structure.

It should be noted that the appended drawings are not necessarily drawn to scale and that the dimensions of some features may have been exaggerated for the sake of clarity.

DETAILED DESCRIPTION

As required, detailed embodiments are disclosed herein. It should however be realized that the embodiments are included in order to explain principles of the disclosure and not to limit the scope of the disclosure, as defined by the appended claims. Details from two or more of the embodiments may be combined with each other. Furthermore, the figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
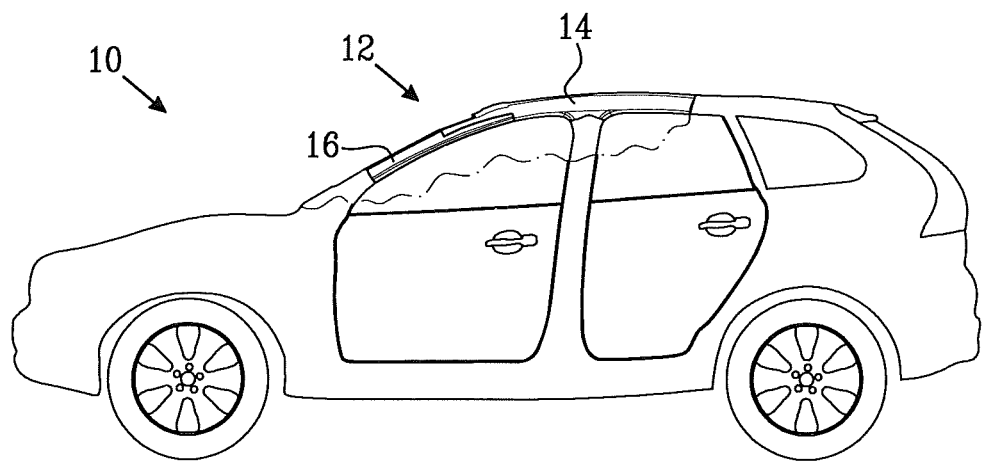
FIG. 1 is a side view of a vehicle according to the disclosure comprising a reinforcement structure according to the disclosure being part of an A-pillar structure.

FIG. 1 illustrates a side view of a vehicle 10 according to the disclosure. The vehicle 10 comprises a reinforcement structure 12 according to the disclosure. Although only one lateral side can be seen in FIG. 1, there is usually a reinforcement structure 12 at either lateral side of the vehicle. In the illustrated embodiment, the reinforcement structure 12 is a part of an A-pillar structure, which extends along a front door and over a B-pillar.

Figure 2:
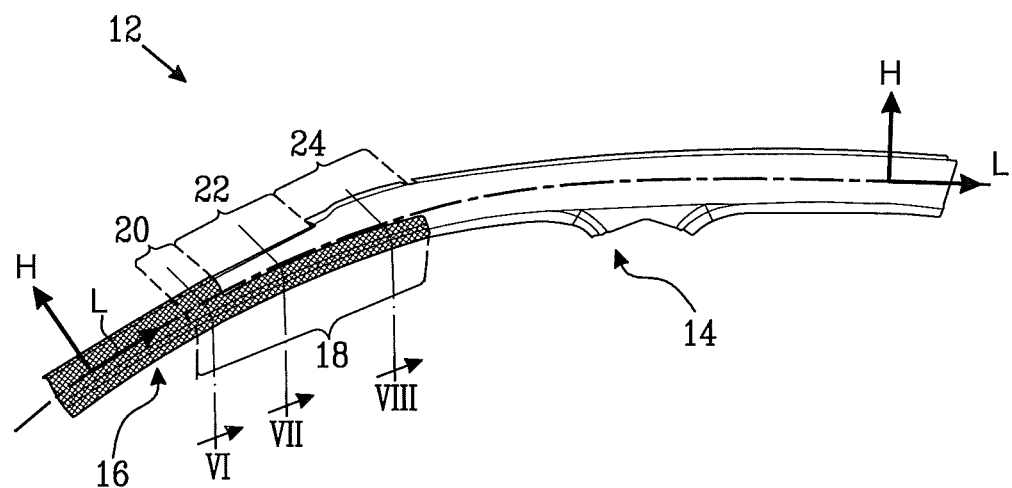
FIG. 2 is an outside view of the reinforcement structure.
Figure 3:
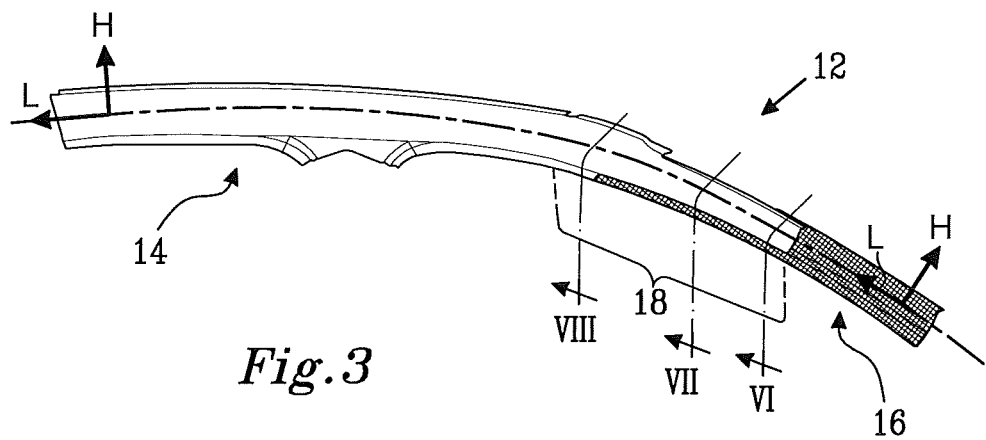
FIG. 3 is an inside view of the reinforcement structure.

FIGS. 2 and 3 illustrate the reinforcement structure 12 seen from the outside of the vehicle 10, as in FIG. 2, and seen from the inside of the vehicle 10, as in FIG. 3. The reinforcement structure 12 has a main extension direction L substantially following a center-line of the reinforcement structure 12. Since the reinforcement structure 12 is part of the A-pillar structure, the main extension direction L is slightly curved, but it is also feasible that the main extension direction is straight, such that the main extension direction forms an axial direction, e.g., if the reinforcement structure is part of another pillar structure, such as a B-pillar. A width direction W is perpendicular to the main extension direction L and goes perpendicularly into the drawing sheet, on which FIG. 2 is shown. A third direction H is perpendicular to the main extension direction L and to the width direction W. Due to the curvature and the inclination of the reinforcement structure 12, the third direction H deviates from the vertical direction, except for where the reinforcement structure 12 extends substantially horizontally, such as at the rear part of the A-pillar structure.

The reinforcement structure 12 comprises a first rearwardly arranged portion 14, forming an upper portion of the A-pillar structure, and a second forwardly arranged portion 16, forming a lower portion of the A-pillar structure. The first portion 14 and the second portion 16 are joined to each other in an overlap zone 18 extending along the main extension direction L, such that the first portion 14 and the second portion 16 extend parallel to each other in the overlap zone 18.

The overlap zone 18 has an extension along the main extension direction L of the reinforcement structure 12 being in the range of 100-800 mm, preferably in the range of 200-600 mm, more preferably in the range of 300-500 mm. In the overlap zone 18, the first portion 14 and the second portion 16 extend side by side as seen in the width direction W, as is further described below in conjunction with FIGS. 6-8. The overlap zone 18 comprises a forward portion 20, a mid-portion 22 and a rear portion 24, with the forward portion 20 being located closest to a front of the vehicle 10.

Figure 4:
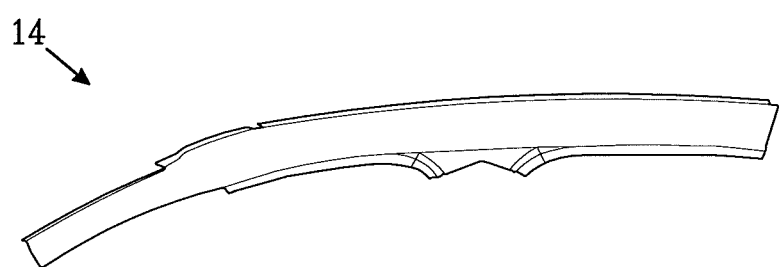
FIG. 4 is an outside view of a first portion of the reinforcement structure.
Figure 5:
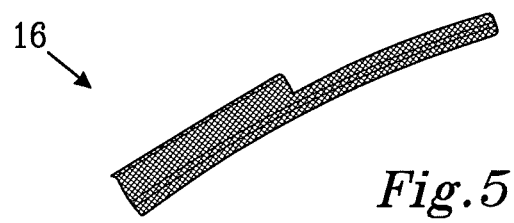
FIG. 5 is an outside view of a second portion of the reinforcement structure.

FIG. 4 illustrates the first portion 14 and FIG. 5 illustrates the second portion 16. The first portion 14 comprises, or consists of, a more ductile material than the second portion 16, making the first portion 14 more ductile than the second portion 16. The second portion 16 comprises, or consists of, a stronger and/or thicker material than the first portion 14, making the second portion 16 stiffer than the first portion 14.

Different kinds of steel may be utilized for the first portion 14 and the second portion 16. The material of the first portion 14 may have an elongation above 20%. The second portion 16 may have a tensile strength of at least 1300 MPa. The elongation of the material of the second portion 16 may be selected to be less than 20%. The second portion 16 may comprise boron steel. Since two different materials are utilized, the material properties of the respective first 14 and second 16 portions may be selected independently of each other, as long as the two materials are possible to join in the overlap zone 18.

FIGS. 6-8 show how the first portion 14 and the second portion 16 are joined to each other by illustrating different cross-sections through the overlap zone 18, as indicated in FIG. 2. The first portion 14 and the second portion 16 may e.g., be joined to each other by means of welding, e.g., spot welding or laser welding.

FIG. 6 illustrates a vertical cross-section through an A-pillar structure at the forward portion 20 of the overlap zone 18. The first portion 14 and the second portion 16 together form an inner reinforcement structure of the A-pillar structure. A wall portion 26 of the first portion 14 is welded to a wall portion 28 of the second portion 16 in a side-by-side configuration as seen in the width direction W. The wall portions 26, 28 extend substantially vertically and are substantially fully overlapping with each other being in direct contact. Further, a flange portion 30 of the first portion 14 is welded to a flange portion 32 of the second portion 16, which is superposed on the flange portion 30 of the first portion 14. The first portion 14 and the second portion 16 hence overlap in the width direction W and in the third direction H. In addition, the first portion 14 and the second portion 16 overlap in the main extension direction L, which may be gleaned from FIGS. 2 and 3. The A-pillar structure also comprises an outer reinforcement structure 34 and an exterior panel 36. The first portion 14 has an L-shaped cross-section comprising the wall portion 26 and the flange 30. The cross-section of the second portion 16 has an upper L-shaped part comprising the wall portion 28 and the flange 32. The second portion 16 then continues downwards via a bend 38 and joins with the outer reinforcement structure 34 and the exterior panel 36 vertically below the first portion 14.

FIG. 7 illustrates a cross-section through the A-pillar structure at the mid-portion 22 of the overlap zone 18. The cross-section also illustrates the reinforcement structure 34 and the exterior panel 36 located laterally outwards of the second portion 16. The wall portion 26 of the more ductile first portion 14 is welded to the wall portion 28 of the less ductile second portion 16 giving a partial overlap of the two wall portions 26, 28. The first portion 14 and the second portion 16 hence overlap in the third direction H. In addition, the first portion 14 and the second portion 16 overlap in the main extension direction L. The first portion 14 has an L-shaped cross-section like in FIG. 6. The second portion 16 has no flange 32 in the mid-portion 22 of the overlap zone 18. The wall portion 28 of the second portion 16 continues downwards via the bend 38 and joins with the outer reinforcement structure 34 and the exterior panel 36 vertically below the first portion 14, similar as for FIG. 6.

FIG. 8 illustrates a cross-section through the A-pillar structure at the rear portion 24 of the overlap zone 18. The cross-section also illustrates the reinforcement structure 34 and the exterior panel 36 located laterally outwards of the second portion 16. The wall portion 26 of the first portion 14 is welded to the wall portion 28 of the second portion 16 giving a partial overlap of the two wall portions 26, 28, which overlap is shorter than the partial overlap of FIG. 7. The first portion 14 and the second portion 16 hence overlap in the third direction H. In addition, the first portion 14 and the second portion 16 overlap in the main extension direction L. The flange 30 of the first portion 14 is wider in the rear portion 24 of the overlap zone 18 than in the mid-portion 22 and the forward portion. The wall portion 26 of the first portion 14 continues downwards via a bend 40 and joins with the second portion 16, the reinforcement structure 34 and the exterior panel 36. The wall portion 28 of the second portion 16 is shorter than in the cross-section of the mid-portion 22 in FIG. 7. The wall portion 28 of the second portion 16 continues downwards via the bend 38 and joins with the first portion 14, the reinforcement structure 34 and the exterior panel 36.

If the vehicle 10 would be subjected to a front impact, a main portion of the collision load would be taken up by the strong second portion 16, which is most forward and thus closest to the impact zone, resulting in the reinforcement structure 12 being stiff in a front impact scenario, thereby helping to protect occupants in a passenger compartment of the vehicle 10. In the overlap zone 18, the lateral outside of reinforcement structure 12 would be subjected to a pressure load, while the lateral inside would be subjected to a tension load. By utilizing a reinforcement structure 12 as described herein, the pressure load would mainly be taken up by the stiffer second portion 16, while the tension load would be taken up by the more ductile first portion 14. The overlap zone 18 provides a strong connection between the first portion 14 and the second portion 16 in the front impact scenario and constitutes a transition zone between the part of the reinforcement structure 12 being mainly subjected to a pressure load and the part of the reinforcement structure 12 being mainly subjected to a tension load.

Correspondingly, if the rearmost pillar, e.g., a C-pillar or a D-pillar, comprises a reinforcement structure as described herein, the reinforcement structure would be arranged with the stronger portion facing rearward in the vehicle whereby the reinforcement structure would be stiff in a rear impact scenario, thereby helping to protect the occupants in the passenger compartment.

If the vehicle 10 would be subjected to a pole side impact situation at the reinforcement structure 12, the pole would press the reinforcement structure 12 laterally inwards, into the vehicle passenger compartment. The pole side impact generally hits the vehicle 10 in the overlap zone 18 and above the overlap zone 18, where the more ductile first portion 14 is present. A large portion of the impact load will be taken up by the flange portion 30 of the first portion 14, which substantially extends laterally inwards in the vehicle 10. The main load is taken up by the more ductile first portion 14, such that the reinforcement structure 12 as described herein will bend without cracking, or at least it will be substantially less likely to crack, due to the high ductility in the first portion 14. The reinforcement structure 12 will therefore improve the ability of the vehicle 10 to survive the side impact without suffering passenger compartment intrusion.

It would be feasible to dispense with one or two of the forward portion 20, the mid-portion 22 and the rear portion 24. However, it is preferred to have all three portions present as in the illustrated embodiment.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A reinforcement structure for a vehicle, the reinforcement structure having a main extension direction and comprising:
    a first portion and a second portion, the first portion comprising a more ductile material than the second portion, wherein the first portion and the second portion are joined to each other in an overlap zone extending along the main extension direction, such that the first portion and the second portion extend parallel to each other along the main extension direction in the overlap zone;
    wherein, when the reinforcement structure is mounted in the vehicle, the first portion is configured to form an upper portion of the reinforcement structure, the second portion is configured to form a lower portion of the reinforcement structure, the first portion extends rearwardly of the second portion, the first portion extends away from the overlap zone and upwards, the second portion extends away from the overlap zone and downwards, and the first and second portions do not overlap outside of the overlap zone.

2. The reinforcement structure according to claim 1 wherein the overlap zone has an extension along the main extension direction in the range of 100-800 mm.

3. The reinforcement structure according to claim 1 wherein the overlap zone has an extension along the main extension direction in the range of 200-600 mm.

4. The reinforcement structure according to claim 1 wherein the overlap zone has an extension along the main extension direction in the range of 300-500 mm.

5. The reinforcement structure according to claim 1 wherein the second portion comprises a stronger material than the first portion.

6. The reinforcement structure according to claim 1 wherein the first portion and the second portion extend at least partly side by side as seen in a width direction in the overlap zone.

7. The reinforcement structure according to claim 1 wherein a wall portion of the first portion is joined to the second portion in the overlap zone.

8. The reinforcement structure according to claim 1 wherein the first portion and the second portion are joined to each other by means of welding.

9. A vehicle pillar structure comprising the reinforcement structure according to claim 1, wherein the vehicle pillar structure is an A-pillar structure.

10. The vehicle pillar structure according to claim 9 wherein the reinforcement structure forms an inner reinforcement structure of the vehicle pillar structure.

11. The vehicle pillar structure according to claim 10 wherein the first portion comprises a flange portion forming an upper flange of the inner reinforcement structure.

12. The vehicle pillar structure according to claim 11 wherein the second portion is adapted to continue downwards via a bend to join with an outer reinforcement structure.

13. A vehicle comprising:
a reinforcement structure positioned at a lateral side of the vehicle and having a main extension direction, the reinforcement structure including a first portion and a second portion, the first portion comprising a more ductile material than the second portion, wherein the first portion and the second portion are joined to each other in an overlap zone extending along the main extension direction, such that the first portion and the second portion extend parallel to each other along the main extension direction in the overlap zone;
wherein the first portion is configured to form an upper portion of the reinforcement structure, the second portion is configured to form a lower portion of the reinforcement structure, the first portion extends rearwardly of the second portion, the first portion extends away from the overlap zone and upwards, the second portion extends away from the overlap zone and downwards, and the first and second portions do not overlap outside of the overlap zone.

14. The vehicle according to claim 13 wherein the first portion and the second portion extend side by side as seen in the width direction in the overlap zone, the first portion being located facing an interior of the vehicle and the second portion facing outwards.

15. A method of manufacturing a reinforcement structure for a vehicle, the reinforcement structure having a main extension direction and comprising a first portion and a second portion, the method comprising:
joining a first portion and a second portion to each other in an overlap zone extending along the main extension direction, such that the first portion and the second portion extend parallel to each other along the main extension direction in the overlap zone, wherein the first portion comprises a more ductile material than the second portion, and wherein, when the reinforcement structure is mounted in the vehicle, the first portion is configured to form an upper portion of the reinforcement structure, the second portion is configured to form a lower portion of the reinforcement structure, the first portion extends rearwardly of the second portion, the first portion extends away from the overlap zone and upwards, the second portion extends away from the overlap zone and downwards, and the first and second portions do not overlap outside of the overlap zone.

16. The reinforcement structure according to claim 1 wherein the second portion has a greater height, in a direction perpendicular to the main extension direction, than the first portion adjacent the overlap zone.

17. The method according to claim 15 wherein the first portion and the second portion are joined to each other by welding.

18. The reinforcement structure according to claim 1 wherein the reinforcement structure is configured to be positioned at a lateral side of the vehicle.

19. The method according to claim 15 wherein the reinforcement structure is configured to be positioned at a lateral side of the vehicle.

* * * * *